United States Patent [19]

Moerman

[11] 4,161,772
[45] Jul. 17, 1979

[54] CONVERSION AND CONTROL OF ELECTRICAL ENERGY BY ELECTROMAGNETIC INDUCTION

[76] Inventor: Nathan A. Moerman, 7310 Maple Ave., Chevy Chase, Md. 20015

[21] Appl. No.: 849,379

[22] Filed: Nov. 7, 1977

Related U.S. Application Data

[62] Division of Ser. No. 762,896, Jan. 26, 1977, which is a division of Ser. No. 635,007, Nov. 25, 1975, Pat. No. 4,020,440.

[51] Int. Cl.$^2$ ............................................. H02M 7/02
[52] U.S. Cl. ........................................ 363/44; 363/75; 363/90; 363/140
[58] Field of Search .................. 363/44, 64, 75, 84, 363/90, 91, 140, 171; 323/6, 48, 36, 60, 61, 22 R

[56] References Cited

U.S. PATENT DOCUMENTS

| | | | |
|---|---|---|---|
| 2,435,062 | 1/1948 | Walsh | 363/140 |
| 3,187,273 | 6/1965 | Chasek | 323/22 R |
| 3,422,341 | 1/1969 | Kurimura et al. | 363/91 |

Primary Examiner—Gerald Goldberg
Attorney, Agent, or Firm—Thomas O. Maser

[57] ABSTRACT

An alternating to direct current power converter utilizing dynamically controlled electromagnetic induction. A feedback system controls permeance within a network of magnetic paths by progressive saturation or domain rotation within selected portions of the paths to provide unidirectional direct current power from an ac input.

2 Claims, 2 Drawing Figures

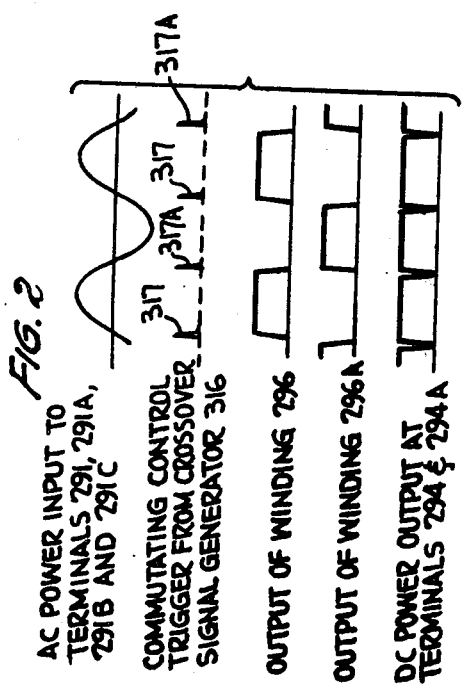

CONVERSION AND CONTROL OF ELECTRICAL ENERGY BY ELECTROMAGNETIC INDUCTION

GOVERNMENT USE

The invention described herein may be manufactured and used by or for the government of the United States of America for governmental purposes without the payment to me of any royalties thereon.

This is a division of application Ser. No. 762,896 filed Jan. 26, 1977, which, in turn was a division of application Ser. No. 635,007 filed Nov. 25, 1975, now U.S. Pat. No. 4,020,440.

RELATED PATENT

This invention is closely related to my U.S. Pat. No. 4,020,440 issued Apr. 26, 1977, which is incorporated by reference.

FIELD OF THE INVENTION

This invention relates to the field of conversion and control of electrical energy, and more specifically to AC/DC power conversion by static magnetic means.

SUMMARY

Control of magnetic flux in a closed magnetic path is accomplished by the progressive control of permeance in an assigned section of the path. Several configurations for continuous permeance control by progressive saturation and/or domain rotation are described in my related U.S. Pat. No. 4,020,440.

Utilizing this technology, I have developed a unique apparatus for AC/DC power conversion by purely static magnetic means. More specifically, in an alternating to direct current power converter, two identical permeance controlled direct current power pulse transformers are alternately switched in a time sequence determined by the zero crossover points of the input alternating current waveform. Alternate positive and negative lobes of the input alternating current power are distributed between the transformers by this means for modification within the permeance controlled transformer into a near direct current square waveform at the output. A feedback system through the permeance control means continually adjusts the electromagnetic induction in the output winding to produce the near square waveform. Combined outputs of the two power pulse transformers in series aiding connection produces a continuous direct current power output with slight depressions marking the switching transition periods, in contrast with the large magnitude of low frequency ripple power resulting from conventional alternating to direct current converter.

It is, therefore, an object of this invention to provide electrical power control by controlled electromagnetic induction.

Another object of this invention is to provide a controlled electromagnetic induction means for alternating to direct current power conversion and control.

A still further object of this invention is the elimination of moving parts and electrical controlling elements which have current and/or voltage limitations and fixed forward voltage drops.

A still further object of this invention is to provide an electric power control means responsive to a sensed physical state, such as: voltage, current, power, temperature, pressure, strain, humidity, acidity, or the like.

Another object of this invention is to provide control of electrical power by electronic control of magnetic means in static configurations.

Yet another object of this invention is to provide switching of electrical circuitry without the use of mechanical switches.

An object of this invention is to provide the means for the computer control of power subsystems in an electric power network.

Still another object of this invention is to provide means for control of voltage, current, and phase of a power subsystem of an electrical power network.

The exact nature of this invention as well as other objects and advantages thereof will be readily apparent from consideration of the following specification relating to the annexed drawings in which:

BRIEF DESCRIPTION OF THE DRAWINGS

FIG. 2 is a time sequence chart for the operation of the converter of FIG. 1.

DESCRIPTION OF A PREFERRED EMBODIMENT

Figure 1:
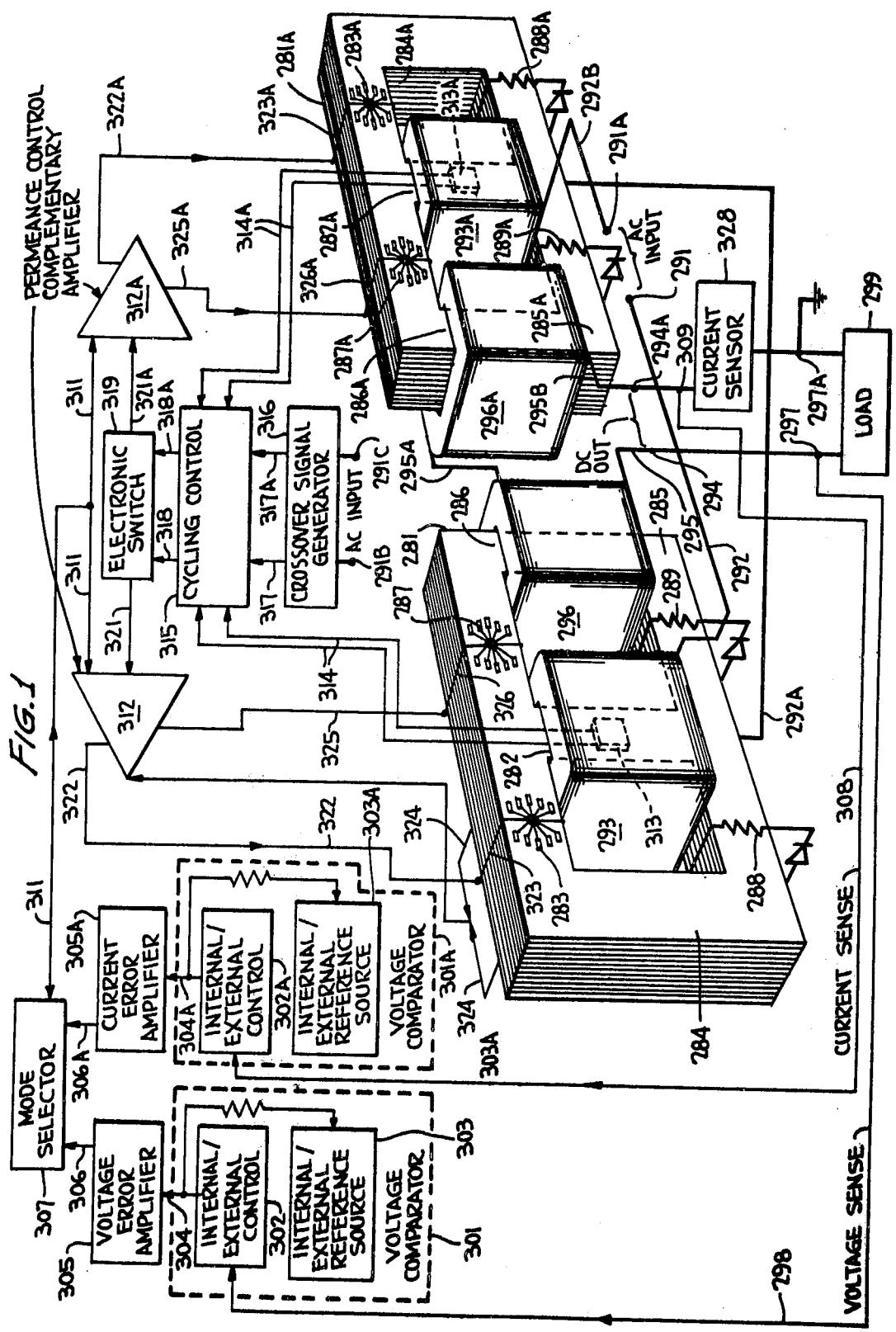
FIG. 1 shows an alternating to direct current power converter.

In this invention, alternating current power is converted to direct current power through the dynamically controlled electromagnetic induction in commutated power pulse transformers. The input alternating current power sine waveform is treated as a consecutive series of power pulses of sine waveform and alternately reversed polarity. Two permeance controlled power pulse transformer structure and associated control amplifiers of identical structure are assigned, respectively, to the positive and negative lobes of input alternating current power and alternately activated to respond to its assigned input power lobe.

A feedback system including reference voltage comparison circuitry, and output adjustment means provide the controlling action to transform the sine waveform input power into contiguous unidirectional direct current power pulses of nearly constant amplitude. This invention is unique in its ability to combine the separate state of the art functions of voltage transformation, rectification, filtering, and voltage and current control into a single operation within the controlled magnetic structure described herein. In addition, the transformer-like structure of the embodiments of this invention permits the scaling to any voltage, current or power level to the limits imposed by state of the art electrical power transformer technology.

A further unique characteristic of this invention is its ability to allow the desired physical state of the load to control the output of the converter through the feedback circuit.

Polyphase applications of this invention are easily achieved by the series or parallel connection of the direct current outputs from the separate phases of alternating current input, with voltage and/or load current sharing provided by the automatic voltage or current control in the feedback system.

The flux excursion in each transformer core structure is limited to approximately one half of the flux excursion within a conventional alternating current power transformer. This inefficiency in core utilization must be assessed in terms of overall permeance advantages in a system tradeoff consideration.

This invention makes use of variable magnetics for controlling electromagnetic induction to change sine waves into contiguous direct current pulses.

Turning now to the drawing, FIG. 1 shows the structure whereby an alternating current input is converted into a direct current output.

Two permeance controlled power pulse transformer structures, or cores 281 and 281A are made of laminated elements as previously described. Core 281 is configured to have an input leg 282, a first permeance control section 283, a bypass leg 284, a return leg 285, an output leg 286, and a second permeance control 287. Around the bypass leg 284 is a first reverse transient suppressor 288 and a second reverse transient suppressor 289 is around return leg 285. For core 281A, the identical components as found in core 281 are numbered with an additional A. An alternating current input applied at terminals 291, 291A is connected through a first connector 292, an input winding 293 on input leg 282 of core 281, a second connector 292A, a second input winding 293A on input leg 282A of core 281A, and a third connector 292B back to terminal 291A. A direct current output is available at output terminals 294 and 294A. A first output connector 295 connects terminal 294 to an output winding 296 on leg 286 of core 281. A second output connector 295A serially connects output winding 296 to a second output winding 296A on leg 286A of core 281A and a third output connector 295B connects said output winding 296A to said output terminal 294A. The system load is connected to output terminals 297 and 297A.

The control structure for the above cited power structure is now set forth. Between output terminal 294 and a load terminal 297 is connected a voltage sense feedback connector 298 which is an input to a first voltage comparator 301 wherein the desired voltage variations are introduced. An internal or external reference source 303 which supplies the reference voltage level against which the actual output feedback voltage is compared in order to produce an error signal indicative of the deviation from the desired voltage output, as established by the internal or external control 302. The error signal is supplied through a connector 304 to a voltage error amplifier 305 which, through an output connector 306, provides an input to a mode selector 307. The mode selector 307 determines whether the voltage error or the current error is dominant and will be applied as the control mode. The current error is derived from a signal supplied through current sense connector 308 with one end thereof connected at junction 309 which is in a connector between output terminal 294A and load terminal 297A. Also connected between junction 309 and terminal 297A is a current sensor 328 which may be a simple resistor means. The other end of connector 308 is connected as an input to a second voltage comparator 301A and is connected directly to the internal or external current level control 302A. An internal or external reference source 303A is connected across a voltage drop means to be combined through connector 304A as the output of the voltage comparator 301A, such output is a signal indicative of the current error that exists between the load current through sensor 328 and the current level established by control 302A and reference source 303A. This output is the input to current error amplifier 305A which produces an output through connector 306A which is applied as a second input to mode selector 307. The output of mode selector 307 is connected through a connector 311 as one of the inputs to each of a pair of permeance control complementary amplifiers 312 and 312A, respectively.

A first flux density sensor 313 is mounted in intimate magnetic contact with the input leg 282 of core 281, within input winding 293. Flux density sensor 313 is connected by a connector pair 314 as an input to a cycling control and override limit sensor 315. A second flux density sensor 313A is mounted in intimate magnetic contact with input leg 282A of core 281A, within input winding 293A. Flux density sensor 313A is connected by a connector pair 314A as a second input to cycling control and override limit sensor 315. The alternating current input applied at terminals 291 and 291A is also applied to control terminals 291B and 291C. To these control terminals are connected the crossover signal generator 316 which provide output signals at the zero crossover points of the input alternating current waveform through connectors 317 and 317A as a third and a fourth inputs to the cycling control and override limit sensor 315. The output of the control and sensor 315 is applied through connectors 318 and 318A as controlling inputs to an electronic switch 319. Connector 321 is the means through which a first output of the electronic switch 319 is applied as a second input to permeance control complementary amplifier 312 and connector 321A connects a second output of electronic switch 319. The electronic switch alternately activates the amplifiers 312 and 312A.

Outputs of amplifier 312 are connected through connector 322 to winding 323 of permeance control section 283 back through common connector 324 to amplifier 312, and through connector 325 to winding 326 of permeance control section 287 back through common connector 324 to amplifier 312. The outputs of amplifier 312A are connected identically as those from aplifier 312 with the identical structural elements being further designated with the letter A.

Operation of the alternating to direct current power converter of FIG. 1 is described with reference to the waveform sequence diagram in FIG. 2. Alternating current power input connected to terminals 291 and 291A, as well as 291B and 291C, has its positive lobe energize winding 293 of permeance controlled pulse transformer 281, for example, of the commutated power pulse transformer pair, and its negative lobe energize winding 293A of permeance controlled power pulse transformer 281A. Commutation actuation signals are derived from the alternating current input applied through terminals 291B and 291C to zero crossover signal generator 316 which produces such actuation signals as illustrated by the second waveform in FIG. 2. Alternately assigned to the positive and negative lobes, these signals are connected through 317 and 317A, respectively, to the cycling control 315 to effect the alternation of electronic switch 317; first through connector 318 and then through connector 318A, alternately. Pulse transformers 281 and 281A are thereby alternately activated through their respective amplifiers 312 and 312A by the electronic switch 319 to synchronously accept the positive lobe of the input alternating current power by transformer 281, for example, followed by the negative lobe of the input alternating current power by transformer 281A. The sinewave lobes become power pulses for transformation into direct current power pulses of controlled amplitude.

Pulse transformer 281 in the active state, to continue the example, accepts the positive lobe of alternating current input power through its input winding 293. The flux generated by the input winding 293 in its enclosed core leg 282 is distributed between output path 285, 286 and the bypass path 284 under control of the apportioning permeance control sections 283 and 287 activated by the permeance control complementary amplifier 312. The following negative lobe is similarly treated by transformer 281A. Controlling signals for the complementary amplifiers are dependent upon the predetermined output conditions as established within the voltage comparators 301 and 301A, for constant voltage or constant current operation, respectively. In responding to the desired preset output condition, the permeance controlled pulse transformers extract near squarewave direct current power pulses from the input sine waveform power pulses. This is achieved by the controlled electromagnetic induction in the output windings 296 and 296A and results from the flux apportioned to the output legs of the magnetic structures. The series aiding connection of these windings produce a continuous direct current output with slight depressions in amplitude occurring during the pulse transition periods. These depressions are diminished by the inherent filtering of the output and load circuits.

To minimize the responsive time feedback system to output variations and switching activations, the permeance control drive amplifier is designed with a constant current control characteristic. The inherent high dynamic resistance of this configuration greatly diminishes the reluctance over resistance time constant of the permeance control circuit.

Magnetic energy stored throughout the activated period in a pulse transformer is normally dissipated as thermal energy in the reverse transient suppressors during the transitional period at the time of commutation between pulse transformers. In large power handling equipment, this stored energy may be economically recovered by charging a capacitor bank or secondary battery to provide a power source for accessory applications.

It is to be noted that the function performed by these commutated permeance controlled pulse transformers is divided among separate elements in the previous state of the art of alternating to direct current power conversion. That is, an electric transformer is required to transform the input voltage to the desired level followed by a power rectifying assembly to produce unidirectional power, requiring smoothing filters to reduce the ripple voltage resulting from the rectification process. For stabilized adjustable direct current output, an electronic voltage and current feedback stabilizing subsystem is added. This, the potential savings in complexity and cost by the implementation of this invention is promising.

Alternating to direct current power conversion is the most prominent of electric power conversion requirements. Applications range from bulk power transmission of electrical energy to the excitation of the most sensitive of instrumentation. Performance requirements of this class of converter vary widely. Typically, stabilized output is a primary requirement followed by a means for internal or external adjustment of voltage or current within preestablished limits. In this invention these requirements are satisfied with a unique configuration of permeance controlled pulse transformers. Each of a pair of such transformers is assigned to the positive and negative lobes, respectively, of the input alternating current power. With the feedback system associated with the transformers and sine waveform power is transformed by controlled electromagnetic induction into a stablized near square waveform of desired amplitude. Combining the outputs of the transformers, a direct current power source is generated with a minimum of filtering required, in contrast to other static conversion systems. Within this configuration are the means for internal or external adjustment of output voltage or current.

For highly stabilized precision direct current sources, this configuration of this invention can be used as a preregulator connected to a precision regulator of design already established in the art.

This invention can be configured into a system complex for the bulk transmission and distribution of electrical energy by the more efficient direct current transmission circuit. The instant invention of FIG. 1 forms the source of electrical energy for the direct current transmission circuit, which is terminated at one point or several branch points by the direct to alternating current power converter as described in relation to FIG. 11 of my related U.S. Pat. No. 4,020,440. To provide circuit protection and arcless switching at the terminations of the transmission circuit, the embodiment of FIG. 6 of the above-identified related Patent is uniquely applicable.

Another unique and important capability of this invention is the means for generating a variable frequency source of single phase or polyphase power for synchronous or induction motor drives, and the means for electronic control of the frequency variation and voltage amplitude.

I claim:

1. In an electromagnetic induction means for converting alternating current power into direct current power,
   a first and second identical electric power pulse transformer means,
   each of said identical means having an input path means, an output path means, a bypass means, an input winding means on said input path means, an output winding means on said output path means, a first electromagnetically coupled variable permeance control means between said input path means and said output path means, a second electromagnetically coupled variable permeance control means between said input path means and said bypass path means,
   a pair of alternating current source terminal means,
   a means connecting said first and second input winding means in series with said pair of alternating current source terminal means,
   a load current sensing means,
   a first and a second direct current output terminal means,
   a means connecting said first output terminal means, said first and second output winding means said load current sensing means and said second terminal output means in series aiding configuration,
   a first, second, third and fourth reverse transient suppression means, each having a winding means and a unidirectional current flow and energy absorbing means,
   said first suppression means surrounding said bypass path means of said first identical means,
   said second suppression means surrounding said output path means of said first identical means,
   said third suppression means surrounding said bypass path means of said second identical means, said fourth suppression means surrounding said output path means of said second identical means, a first voltage comparator means having a direct current reference voltage means and an output voltage setting means producing a voltage error output signal, a voltage feedback means connecting said first voltage comparator means and said first output terminal means, a second voltage comparator means having a direct current reference voltage means and an output direct current setting means producing a current error output signal, a current feedback means connecting said current sensing means to said second voltage comparator means, an operating mode selector means, means connecting the voltage error signal output of said first voltage comparator means as a first input to said operating mode selector means, means connecting the current error signal output of said second voltage comparator means as a second input to said operating mode selector means, a first and a second complementary control amplifier means for alternating a minimum magnetic permeance state and a variable permeance state, means connecting the output of said operating mode selector means as the first input to both of said amplifier means, means connecting the complementary control outputs of said first amplifier means to said first and second variable permeance control means in said first identical means, means connecting the compelmentary control outputs of said second amplifier means to said first and second variable permeance control means in said second identical means, a first flux density sensing means magnetically coupled to said input path means of said first identical means, a second flux density sensing means magnetically coupled to said input path means of said second identical means, a crossover signal generator means, a cycling control means, means connecting said pair of alternating current source terminal means to said crossover signal generator means, means connecting the crossover signal outputs of said crossover signal generator means to said cycling control means, means connecting the output of said first flux density sensing means as the first input to said cycling control means, means connecting the output of said second flux density sensing means as the second input to said cycling control means, an electronic switch means having a first and a second alternating signal output means, means connecting said first output of said electronic switch means to said first complementary control amplifier means as the second input thereto, means connecting said second output of said electronic switch means to said second complementary control amplifier means as the second input thereto, whereby an alternating current input applied to said crossover signal generator produces a crossover pulse to establishing a pulsing frequency control for said cycling control and said electronic switch in conjunction with the alternating output signals from said first and second flux density sensing means, whereby said operating mode selector provides the amplitude control for said complementary control amplifier means in response to voltage and current error signals received thereby, whereby said identical electrical power pulse transformer means produce a pulsed direct current output in response to the variation of permeance in said permeance control means, said variation being provided by said complementary amplifier means.

2. In an apparatus for converting alternating current power into direct current power, a first and a second identical electrical power pulse transformer each having a plurality of variable permeance closed magnetic paths, an input winding and an output winding, an alternating current input, means connecting the alternating current input to both of the input windings for alternately switching the positive half of said alternating current input to the first transformer and the negative half of said alternating transformer and the negative half of said alternating current input to the second transformer, permeance control means connected to each of said transformers for selectively varying the permeance in said magnetic paths to produce an induced voltage in a first output winding which is substantially constant for a time corresponding to the first half of the period of the alternating current input and an induced voltage in the second output winding which is substantially constant for a time corresponding to the second half of the period of the alternating current output, and means for combining said induced voltages to produce a direct current output.

* * * * *